United States Patent
Jones

(10) Patent No.: US 11,057,907 B2
(45) Date of Patent: *Jul. 6, 2021

(54) SPECTRUM SHARING OPTIMIZATION WITHIN A BASE STATION NODE

(71) Applicant: T-Mobile USA, Inc., Bellevue, WA (US)

(72) Inventor: David Jones, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,817

(22) Filed: Jun. 21, 2019

(65) Prior Publication Data
US 2020/0170022 A1    May 28, 2020

Related U.S. Application Data

(60) Provisional application No. 62/771,546, filed on Nov. 26, 2018.

(51) Int. Cl.
*H04W 72/10* (2009.01)
*H04W 76/27* (2018.01)
(Continued)

(52) U.S. Cl.
CPC ............. *H04W 72/10* (2013.01); *H04W 4/06* (2013.01); *H04W 24/08* (2013.01);
(Continued)

(58) Field of Classification Search
CPC ....... H04W 16/14; H04W 24/08; H04W 4/06; H04W 72/0446; H04W 72/10; H04W 76/27

See application file for complete search history.

(56) References Cited

U.S. PATENT DOCUMENTS

| | | | | |
|---|---|---|---|---|
| 6,738,350 B1 * | 5/2004 | Gao | ................... | H04B 7/18584 370/232 |
| 9,578,517 B2 * | 2/2017 | De Pasquale | ......... | H04W 16/14 |

(Continued)

FOREIGN PATENT DOCUMENTS

| KR | 20160074685 A | 6/2016 |
|---|---|---|
| WO | 2018031746 A1 | 2/2018 |

OTHER PUBLICATIONS

International Application No. PCT/US2018/059489, International Search Report and Written Opinion, dated Feb. 25, 2019, 9 pages.
(Continued)

*Primary Examiner* — Un C Cho
*Assistant Examiner* — Shah M Rahman
(74) *Attorney, Agent, or Firm* — Han Santos, PLLC

(57) ABSTRACT

This disclosure describes techniques that enable a telecommunication network to share available bandwidth within a cell of a base station node between different air-interface technologies, such as Long-Term Evolution (LTE) and 5G-New Radio (5G-NR). The available bandwidth may be shared based on bandwidth allocation rules and an analysis of network traffic, in real-time. Moreover, a Spectrum Sharing Optimization (SSO) system is described that can generate optimization data for delivery to a base station node. The optimization data may include computer-executable instructions that dynamically make use of time-division (i.e. configuring MBSFN subframes) and frequency-division techniques (i.e. configuring BWPs) to share available bandwidth within the cell of the base station node.

20 Claims, 7 Drawing Sheets

(51) Int. Cl.
   *H04W 4/06* (2009.01)
   *H04W 24/08* (2009.01)
   *H04W 72/04* (2009.01)
   *H04W 16/14* (2009.01)

(52) U.S. Cl.
   CPC ....... *H04W 72/0446* (2013.01); *H04W 76/27* (2018.02); *H04W 16/14* (2013.01)

(56) References Cited

U.S. PATENT DOCUMENTS

| | | | |
|---|---|---|---|
| 2014/0206377 A1 | 7/2014 | Priotti | |
| 2016/0057504 A1 | 2/2016 | Shelby et al. | |
| 2016/0295429 A1 | 10/2016 | Enqvist | |
| 2018/0070369 A1* | 3/2018 | Papasakellariou | H04L 5/0053 |
| 2018/0152966 A1* | 5/2018 | Goldhamer | H04W 72/087 |
| 2018/0192404 A1* | 7/2018 | Maaref | H04L 5/0044 |
| 2018/0192426 A1* | 7/2018 | Ryoo | H04W 72/085 |
| 2018/0242163 A1* | 8/2018 | Patel | H04W 48/10 |
| 2018/0270815 A1* | 9/2018 | Bala | H04W 16/14 |
| 2018/0279303 A1* | 9/2018 | Sun | H04W 72/1278 |
| 2018/0323928 A1* | 11/2018 | Yang | H04L 5/0048 |
| 2018/0359337 A1 | 12/2018 | Kodaypak et al. | |
| 2018/0367985 A1* | 12/2018 | Novlan | H04W 8/22 |
| 2019/0045401 A1 | 2/2019 | Zhang et al. | |
| 2019/0045491 A1 | 2/2019 | Zhang et al. | |
| 2019/0053144 A1* | 2/2019 | Subramani | H04W 48/12 |
| 2019/0141695 A1* | 5/2019 | Babaei | H04L 5/001 |
| 2019/0207737 A1* | 7/2019 | Babaei | H04L 27/2607 |
| 2019/0254110 A1* | 8/2019 | He | H04W 76/27 |
| 2019/0312702 A1* | 10/2019 | Yan | H04L 5/0053 |
| 2019/0357264 A1* | 11/2019 | Yl | H04L 5/001 |
| 2019/0394790 A1* | 12/2019 | Damnjanovic | H04W 72/10 |
| 2020/0053758 A1* | 2/2020 | Hosseini | H04W 72/14 |
| 2020/0059407 A1 | 2/2020 | Lu et al. | |
| 2020/0084797 A1* | 3/2020 | Marjelund | H04W 72/14 |
| 2020/0100137 A1* | 3/2020 | Panchai | H04L 41/0896 |
| 2020/0154496 A1* | 5/2020 | Yi | H04W 72/10 |
| 2020/0169998 A1* | 5/2020 | Kim | H04W 72/0446 |
| 2020/0196326 A1* | 6/2020 | Li | H04L 1/1854 |
| 2020/0245324 A1* | 7/2020 | Kim | H04W 4/06 |

OTHER PUBLICATIONS

Jeongho Jeon, "NR Wide Bandwidth Operations," Intel Corporation, IEEE Communications Magazine, Dec. 18, 2017.

ZTE et al., 'Discussion on NR-LTE Co-existence'. R1-1701618, 3GPP TSG RAN WG 1 Meeting#88, Athens, Greece, Feb. 6, 2017 See pp. 1-4.

U.S. Appl. No. 16/181,249, Notice of Allowance dated Jan. 6, 2020, 24 pages.

U.S. Appl. No. 16/848,539, Office Action dated Feb. 23, 2021, 49 pages.

European Patent Application No. 19207989.5, Search Report dated Apr. 15, 2020, 6 pages.

* cited by examiner

SPECTRUM SHARING OPTIMIZATION WITHIN A BASE STATION NODE

CROSS-REFERENCE TO RELATED PATENT APPLICATION

This application claims priority to a commonly owned U.S. Provisional Patent Application No. 62/771,546, filed on Nov. 26, 2018, titled "Generating Resource Blocks within a 5G-NR Spectrum via Bandwidth Parts Technology," which is herein incorporated by reference in its entirety.

BACKGROUND

Present day, wireless networks of a telecommunication network are configured to operate within predetermined frequency ranges. To mitigate interference, an operator of a telecommunication network is licensed to operate within specific bandwidth ranges. Each license may designate one or more air-interface technologies that may be used within the specific bandwidth range. For example, a Long-Term Evolution (LTE) air-interface technology may be licensed to operate at various frequencies, inter alia, between 700 MHz and 2,700 MHz, and comparatively, a 5G-New Radio (5G-NR) air-interface technology may be licensed to operate at various frequencies, inter alia, between 450 MHz and 6,000 MHz.

Therefore, it is desirable for a telecommunication network to make efficient use of available spectrum resources, particularly portions of available bandwidth that can be shared between different air-interface technologies, such as LTE and 5G-NR. Presently, the available spectrum can be split between different air-interface technologies in a fixed manner in order to avoid transmission interference. For example, individual air-interface technologies may be supported by individual cells of a base station node. However, such a fixed share is not efficient, since real-time network traffic can vary significantly over time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
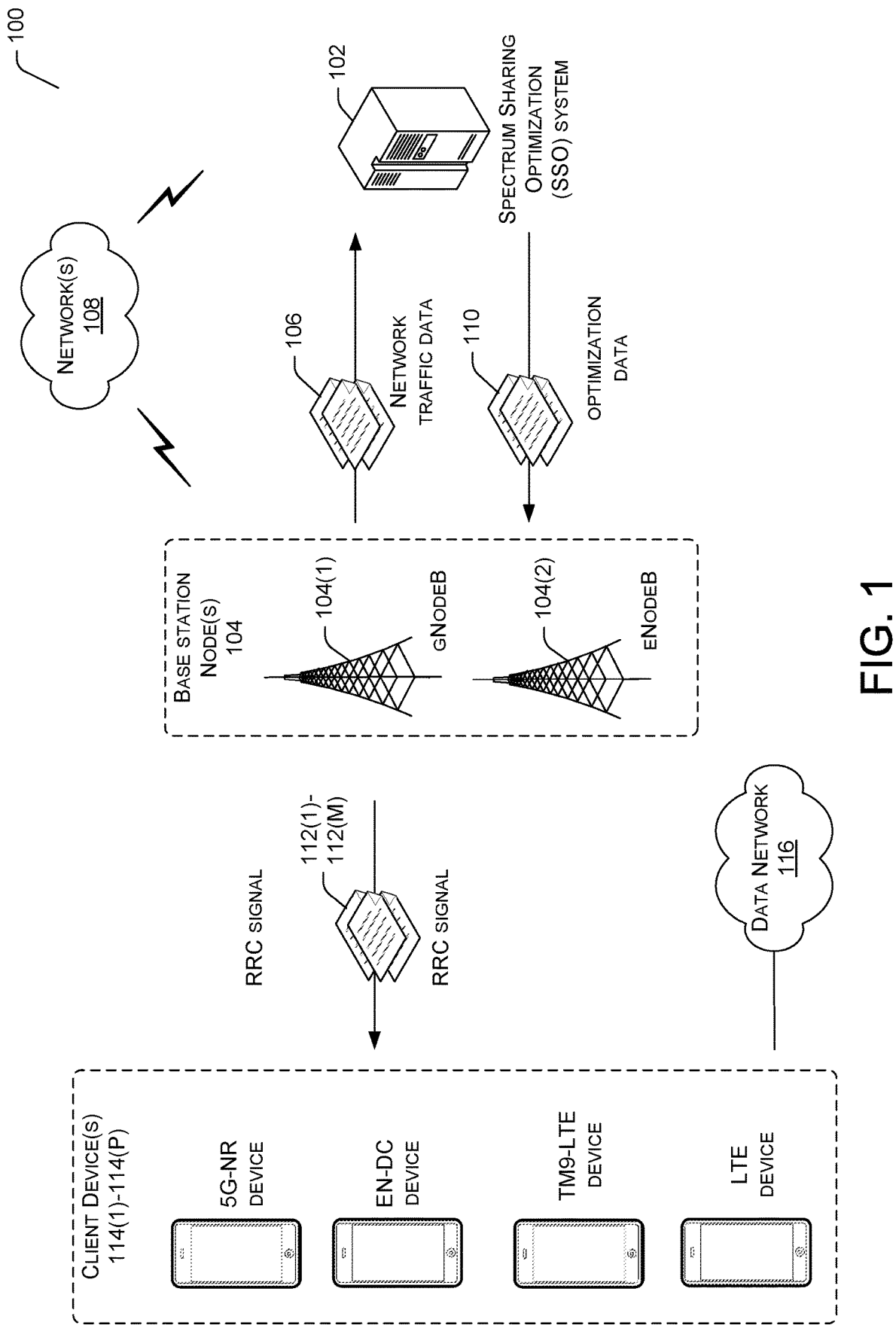
FIG. 1 illustrates an example architecture of a telecommunication network that facilitates the operation of a Spectrum Sharing Optimization (SSO) system.

This disclosure describes techniques that enable a telecommunication network to share available bandwidth within the cell of a base station node between one or more air-interface technologies, such as Long-Term Evolution (LTE) and 5G-New Radio (5G-NR). The sharing of available bandwidth may be based on an analysis of real-time or near real-time network traffic and may use various time-division and frequency-division techniques. In one example, a bandwidth part (BWP) technology (i.e. a frequency division technique) may be combined with a time division duplex (TDD) technology to facilitate the co-existence of overlapping spectrums within an individual cell of a base station node. The techniques further describe monitoring network traffic at a base station node, in real-time or near-real-time, and dynamically allocating available spectrum within the cell of the base station node to different spectrums (i.e. LTE or 5G-NR), based on real-time network demand.

In one example, a telecommunication network may include a base station node that is configured to support two air-interface technologies, namely LTE and 5G-NR. The base station node may include a primary cell and a secondary cell that each support communication transmissions of an individual air-interface technology. For example, the primary cell may be configured to support an LTE air-interface technology, and the secondary cell may be configured to support a 5G-NR air-interface technology or vice versa. In these examples, the base station node may provision available bandwidth within each cell to facilitate the communication transmissions via the air-interface technology associated with that cell. In other words, a base station node may provision available LTE bandwidth within a cell configured to support the LTE spectrum, and similarly, provision available 5G-NR bandwidth within a cell configured to support the 5G-NR spectrum. However, during times of network congestion, the available spectrum within each cell may be unable to support the real-time network demand associated with the air-interface technology (i.e. LTE or 5G-NR) supported by that cell.

Therefore, this disclosure describes a Spectrum Sharing Optimization (SSO) system that is configured to dynamically provision available bandwidth within a cell of a base station node between multiple air-interface technologies. Rather than relying on individual cells of a base station node to support real-time, or near real-time network demand of individual air-interface technologies, (i.e. LTE or 5G-NR), the SSO system may provision available spectrum within an individual cell to simultaneously support real-time network demand of multiple overlapping air-interface technologies, such as LTE or 5G-NR.

In various examples, the SSO system may use frequency division techniques, time division techniques, or a combination of both, to share available bandwidth within a cell of a base station node, between two supported air-interface technologies. Bandwidth part (BWP) technology is an example of a frequency division technique supported within the 5G-NR environment. BWPs can be used to adaptively adjust an operating bandwidth of a cell of a base station node to accommodate a class of 5G-NR client devices or a class of 5G-NR services (i.e. i.e. downloading data, streaming multimedia, communication transmission associated with predetermined user applications, and/or so forth).

Each BWP can be configured differently with its own signal characteristics, enabling more efficient use of the 5G-NR spectrum and corresponding 5G-NR devices. For example, the SSO system may use BWPs to create power saving efficiencies for 5G-NR devices, such as Internet of Things (IoT) devices, by assigning narrow bandwidths for such devices, that lower the sampling rate and reduce baseband processing of their Radio Frequency (RF)-baseband interfaces relative to similar client devices operating within a wider bandwidth. It is noteworthy that BWP technology is a feature of the 5G-NR air-interface technology, and thus can be used as a frequency division technique for 5G-NR devices, and not LTE devices. By way of example, consider a cell of a base station node that is configured to service LTE and 5G-NR communication transmissions. Particularly, the cell may be configured to include one or more BWPs to service 5G-NR communication transmission, while also including a time-division that allocates a portion of subframes to a 5G-NR spectrum and a remaining portion to an LTE spectrum. In this example, LTE communication transmissions may use the full frequency of the available bandwidth assigned to LTE communication transmissions irrespective of the frequency division applied by the one or more BWPs for 5G-NR communication transmissions, since LTE air-interface technology does not recognize BWP configurations. The overlap between time division and frequency division techniques is discussed in more detail with reference to FIGS. 2A through 2C.

Moreover, the SSO system may use spectrum reframing as a time division technique to share available bandwidth between air-interface technologies (i.e. LTE and 5G-NR) with a cell of a base station node. The term "spectrum re-framing" refers to the process of reserving a select number of subframes within a cell of a base station node as Multicast Broadcast Single Frequency Network (MBSFN) subframes and further configuring the MBSFN subframes to facilitate communications via a different air-interface technology, such as LTE or 5G-NR.

The SSO system may employ static, semi-static, or dynamic techniques to allocate available bandwidth of a cell of a base station node between different air-interface technologies. Static sharing refers to a predetermined allocation of bandwidth between different air-interface technologies. The predetermined allocation may be based on market penetration (i.e. prevalence of) client devices associated with each air-interface technology. Semi-static sharing may combine market penetration with real-time, or near real-time network traffic at the base station node. Dynamic sharing may refer to an allocation of available bandwidth based on real-time or near real-time network traffic.

The SSO system may monitor real-time network traffic at the base station node and based on an analysis of the real-time network traffic, assign available bandwidth to an air-interface technology. The available bandwidth may be assigned in real-time, near real-time, or per a predetermined schedule set by an administrator of the telecommunication network or the SSO system.

In some examples, the SSO system may use one or more trained machine-learning algorithms to infer a distribution of available bandwidth between air-interface technologies based on historical network traffic data captured over a predetermined time interval. Further, the SSO system may generate a network-congestion model based on historical network traffic data. The SSO system may correlate real-time network traffic with data points of the network congestion model to infer a distribution of available bandwidth between different air-interface technologies. In some examples, the network-congestion model may include data points that identify network usage characteristics of the real-time network traffic. Network usage characteristics may include identifiers of device types using the network, bandwidth used to stream multimedia content, download multimedia content, Voice over Internet Protocol (VoIP), Video over Internet Protocol (VioIP), and/or so forth.

The SSO system may use the data-points attributable to network usage characteristics to infer a preference of frequency-division or time division techniques. For example, the SSO system may preferentially select a time-division technique, such as a spectrum re-framing technique, for instances of real-time network traffic that exhibits high-bandwidth usage. A time-division technique can allocate communication transmissions in different time slots within the same frequency band. By way of example, the time-division technique may permit client devices operating within an air-interface technology (i.e. LTE or 5G-NR) to use the entire frequency bandwidth of a time slot (i.e. one or more subframes) for communication transmissions.

In contrast, a frequency-division technique may facilitate isolating a set of 5G-NR devices to a narrow bandwidth for the benefit of the 5G-NR devices (i.e. power efficiencies), or for the benefit of other devices operating within the spectrum. Referring to the latter, by assigning the set of 5G-NR devices to a narrow bandwidth, the other remaining devices may share the remaining spectrum unimpeded and without interference.

Moreover, in addition to analyzing real-time network traffic, the SSO system may optimize a sharing of available bandwidth based on one or more scheduling criteria. Scheduling criteria may be configured to maintain a threshold Quality of Service (QoS) for a subset of communication transmissions. The QoS may relate to packet loss, latency, jitter, echo, downlink throughput, uplink throughout, or any combination thereof. In some examples, scheduling criteria may be further based on user-priority, device-priority, service-priority, or any combination thereof. User-priority may correspond to subscriber-status within a telecommunication network; device-priority may correspond to a class of devices (i.e. computers, casting devices, mobile devices, gaming device, television units, and/or so forth); and, service priority may correspond to a class of services (i.e. downloading data, streaming multimedia, VoIP, VioIP, communication transmissions associated with predetermined user applications, and/or so forth) or power optimization criteria. In some examples, scheduling criteria may include rules that maintain a threshold QoS based on user-priority, device-priority, service-priority, or any combination thereof. Alternatively, or additionally, scheduling criteria may also be based on an origin and/or destination of the communication transmission itself. For example, communication transmissions may be prioritized based on being sent to or received from a predetermined geographic location, a predetermined place, or a predetermined event. A predetermined event may include a public-held or privately-held event, such as an entertainment concert, symposium, work-event, celebratory event, and/or so forth. Any type of public or private event is possible.

Further, the term "techniques," as used herein, may refer to system(s), method(s), computer-readable instruction(s), module(s), algorithms, hardware logic, and/or operation(s) as permitted by the context described above and throughout this document.

FIG. 1 illustrates an exemplary architecture 100 of a telecommunication network that facilitates an operation of a Spectrum Sharing Optimization (SSO) system 102. The SSO system 102 may be configured to monitor real-time, or near real-time network traffic of different air-interface technologies, such as LTE and 5G-NR. Further, the SSO system 102 may dynamically provision available bandwidth within a cell of a base station node to accommodate changing network traffic demands at the base station node.

The SSO system 102 may be communicatively coupled to a base station node 104 associated with a telecommunication network, such as a next-generation Node B (gNodeB) 104(1) or an Evolved Node B (eNodeB) 104(2). The gNodeB 104(1) corresponds to a base station node that is configured to transmit and receive wireless communications between a client device and a 5G-NR network. In contrast, the eNodeB 104(2) is a base station node that is configured to transmit and receive wireless communications between a client device and an LTE network.

The SSO system 102 may monitor network traffic at the base station node 104 in real-time, or near real-time, to determine whether to dynamically provision available bandwidth within a cell of the base station node 104. The SSO system 102 may receive network traffic data 106 from the base station node 104, via one or more network(s) 108. The SSO system 102 may analyze the network traffic data 106 and determine a bandwidth requirement within each base station node 104 that is required to accommodate the real-time network traffic for one or more air-interface technologies, namely LTE and 5G-NR. By way of example, the SSO system 102 may determine an LTE bandwidth requirement for real-time network traffic associated with an LTE air-interface technology, and similarly, a 5G-NR bandwidth requirement for real-time network traffic associated with a 5G-NR air-interface technology.

Further, the SSO system 102 may determine that the available LTE bandwidth or 5G-NR bandwidth is less than the corresponding LTE or 5G-NR bandwidth requirement. In doing so, the SSO system 102 may generate optimization data 110 to share available bandwidth within a cell of a base station node 104 between the LTE and 5G-NR air-interface technologies. The optimization data 110 may include computer-executable instructions that cause the base station node 104 to use a frequency division technique, a time division technique, or a combination of both, to share the available bandwidth.

An example of a time-division technique, the SSO system 102 may identify a select number of subframes of a plurality of subframes associated with one cell of the base station node 104 for configuration as MBSFN subframes. In this example, the cell of the base station node 104 may be configured to support an LTE air-interface technology and the MBSFN subframes may be configured to support the alternative, 5G-NR air-interface technology, or vice versa. Similarly, as an example of a frequency-division technique, the SSO system 102 may determine a BWP for 5G-NR communication transmissions within the cell of the base station node.

In some examples, the SSO system 102 may configure the optimization data 110 to include scheduling criteria that prioritize the use of a portion of the cell of the base station for particular communication transmissions. For example, scheduling criteria may prioritize a portion of 5G-NR communications transmissions to occur within a BWP of the cell of a base station node. Similarly, the optimization data 110 may include scheduling criteria that prioritize LTE communication transmissions to bandwidth portions intended to support the LTE spectrum.

Additionally, the SSO system 102 may configure the optimization data 110 to include Radio Resource Control (RRC) signal(s) 112(1)-112(M) intended for client device(s) 114(1)-114(P) that interact with the air-interface technologies via the base station node 104 for access to a data network 116, such as the internet. The RRC signal(s) 112(1)-112(M) may be configured to enable client device(s) 114(1)-114(P) to perform some behavior, such as add, activate, or select a cell or an MBSFN subframe of a cell of the base station node. The RRC signal(s) 112(1)-112(M) may be further configured to select a BWP for communication transmissions via a 5G-NR air-interface technology. In some examples, the SSO system 102 may configure the RRC signal(s) 112(1)-112(M) to prioritize a subset of the client device(s) 114(1)-114(P) over others, based on scheduling criteria. By way of example, scheduling criteria may include power optimization criteria for 5G-NR devices. In this example, the RRC signal(s) 112(1)-112(M) may be configured to prioritize a client device operating within a 5G-NR air-interface technology to transmit and/or receive communication transmissions via a narrowband BWP to lower a sampling rate and reduce baseband processing of RF-baseband interfaces relative to similar client devices operating within a wider 5G-NR bandwidth.

Moreover, the SSO system 102 may configure the optimization data 110 with computer-executable instructions that dynamically transmit the RRC signal(s) 112(1)-112(M) from the base station node 104 to the one or more client device(s) 114(1)-114(P).

In the illustrated example, the client device(s) 114(1)-114(P) may include any sort of electronic device operating in a telecommunication network. The client device(s) 114(1)-114(P) may include a cellular phone, a smartphone, a tablet computer, an electronic reader, a media player, a gaming device, a personal computer (PC), a laptop computer, and/or so forth. The client device(s) 114(1)-114(P) may have a subscriber identity module (SIM), such as an eSIM, to identify the respective electronic device to a telecommunications service provider (also referenced to herein as "telecommunications network").

The SSO system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the base station node 104, via the one or more network(s) 108.

The one or more network(s) 108 may include public networks such as the Internet, private networks such as an institution and/or personal intranet, or some combination of private and public networks. The one or more network(s) can also include any type of wired and/or wireless network, including but not limited to local area network(s) (LANs), wide area networks (WANs), satellite networks, cable networks, Wi-Fi networks, Wi-Max networks, mobile communication networks (e.g. 3G, 4G, LTE, 5G NR, and/or so forth), or any combination thereof.

Moreover, the telecommunication network may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5G New Radio (5G NR), CDMA-2000 (Code Division Multiple Access 2000), and/or so forth. The exemplary architecture 100 may include a core network that may provide telecommunication and data communication services to multiple computing devices, such as a 3G-compatible computing device and an LTE an LTE-compatible computing device, collectively referred to as computing device(s). The telecommunication network may include a core network that may provide telecommunication and data services to multiple computing devices, such as client device(s) 114(1)-114(P).

In various examples, the client device(s) 114(1)-114(P) may include 5G-NR enabled electronic devices, Evolved-Universal Terrestrial Radio Access-New Radio) EN-DC enabled electronic devices, Transmission Mode 9 enabled electronic devices and LTE electronic devices. An EN-DC enabled electronic device can transmit and/or receive communication transmissions via a 5G-NR and an LTE air-interface technology (i.e. dual connectivity). Similarly, a Transmission Mode 9 (TM9) enabled electronic device is an electronic device configured with a transmission mode defined under the LTE air-interface technology but can also transmit and/or receive communication transmissions via a 5G-NR air-interface technology (i.e. dual connectivity).

Figure 2A:
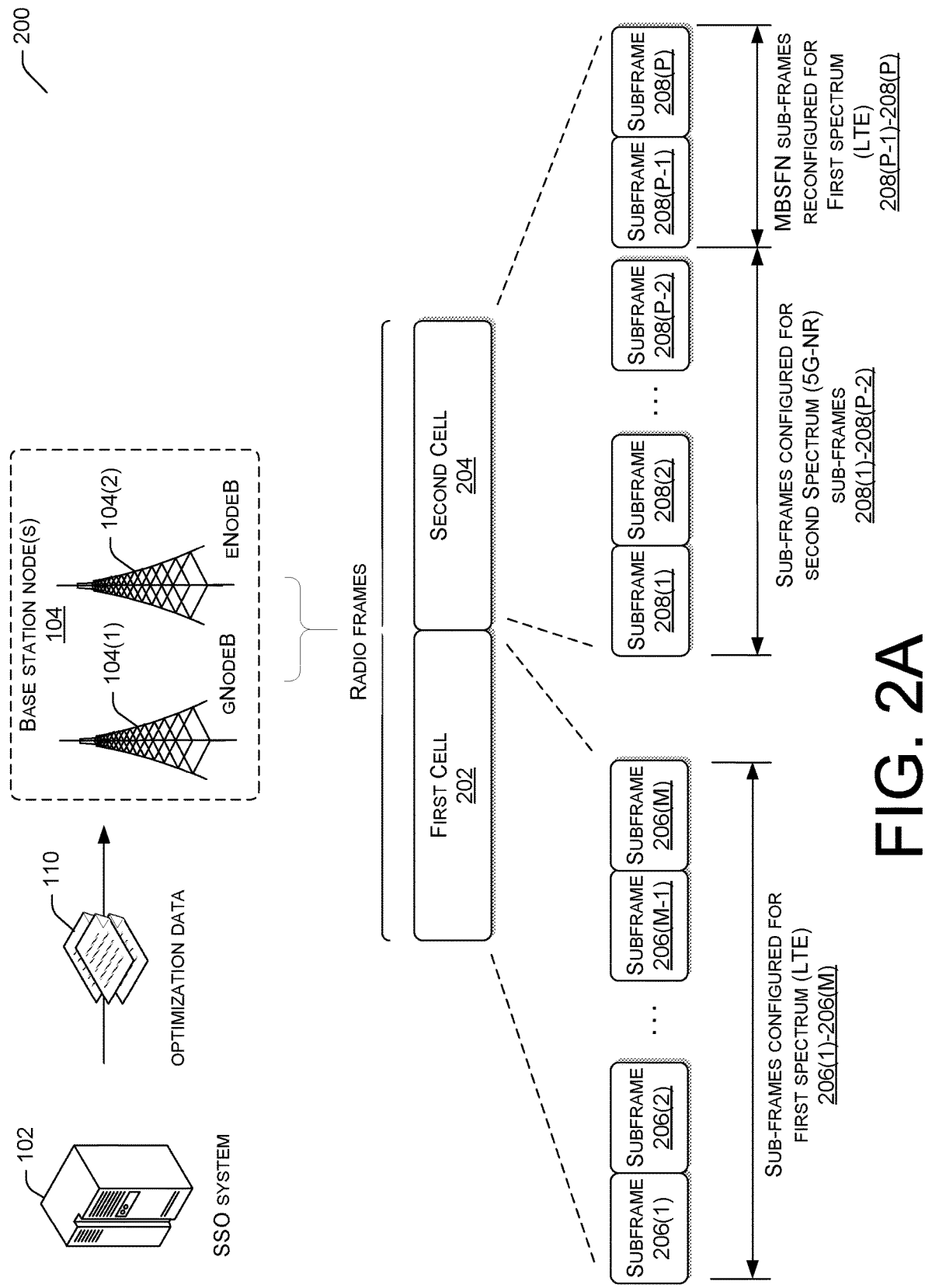
FIGS. 2A through 2C illustrate a block diagram of a Spectrum Sharing Optimization (SSO) system that transmits optimization data to a base station node for configuring available bandwidth between different air-interface technologies.
Figure 2B:
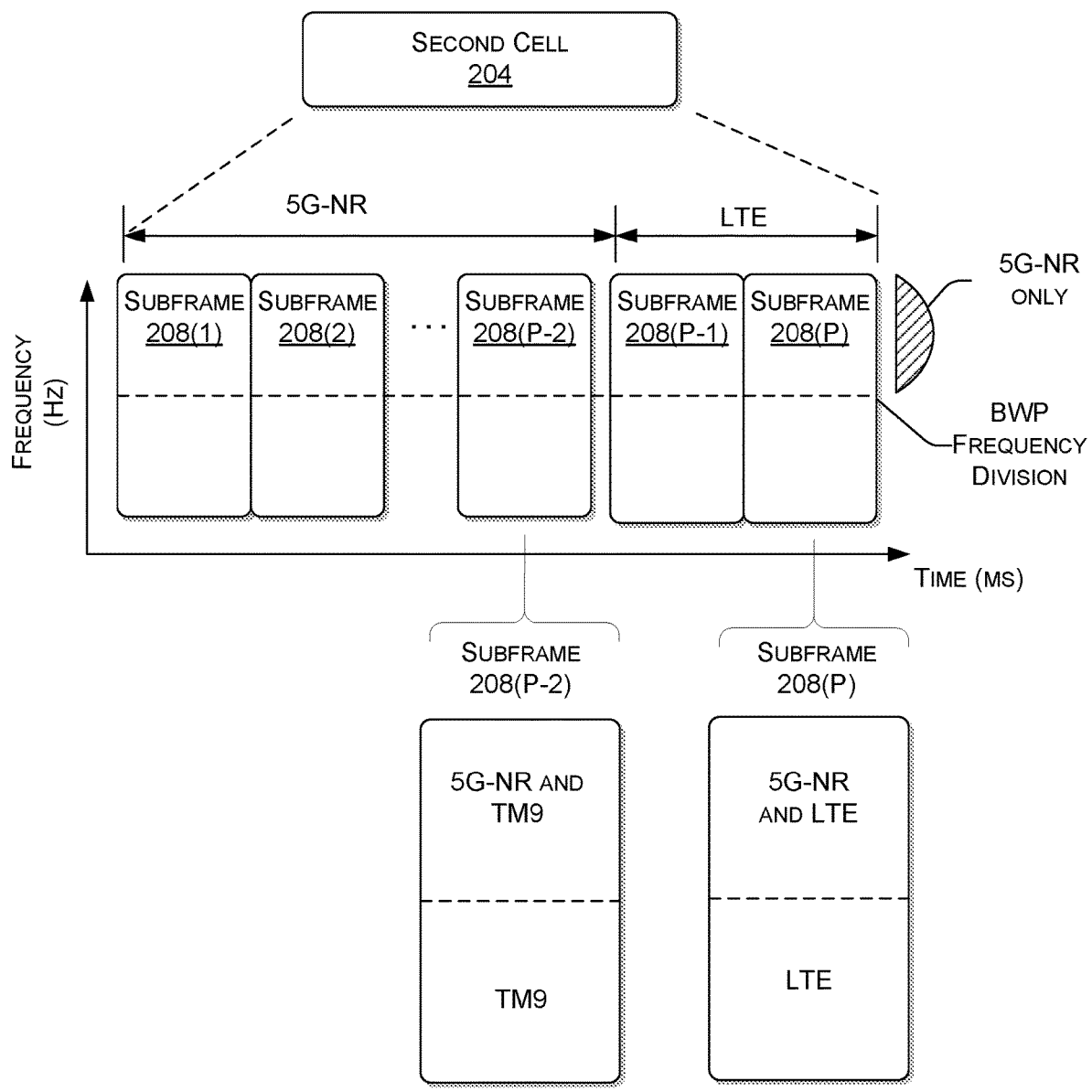
Figure 2C:
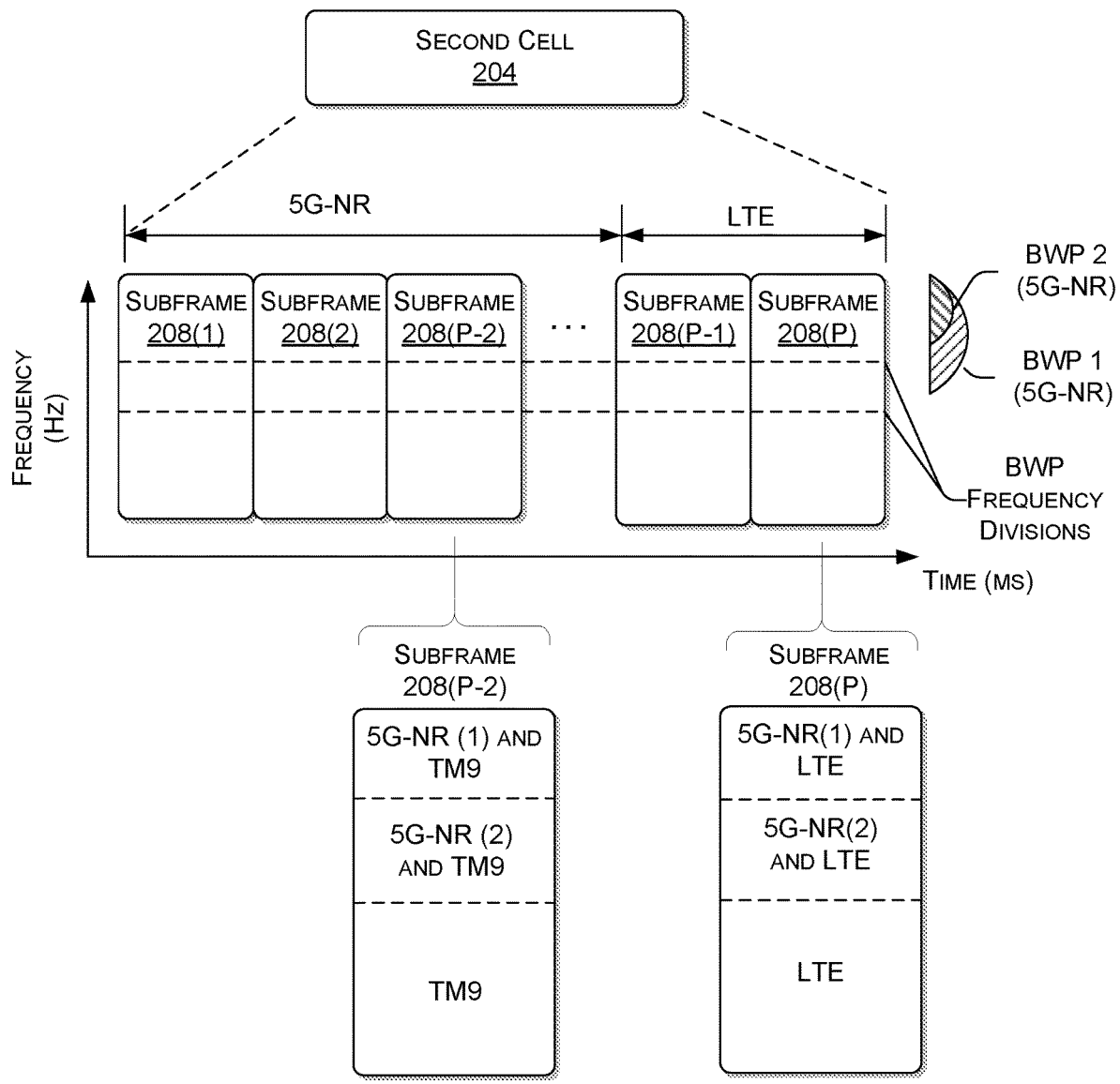

FIGS. 2A through 2C illustrate a block diagram of a Spectrum Sharing Optimization (SSO) system 102 that transmits optimization data 110 to a base station node for configuring available bandwidth between different air-interface technologies. FIG. 2A illustrates an embodiment of optimization data 110 that is configured to share available bandwidth using a time-division technique, namely a spectrum re-framing technique. FIG. 2B illustrates an embodiment of optimization data 110 that is configured to share available bandwidth using a combination of time-division and frequency-division techniques. FIG. 2C illustrates an alternate embodiment of the optimization data 110 that is configured to share available bandwidth using a combination of time-division and frequency-division techniques.

Referring to FIG. 2A, the base station node 104 may include one or more cells that are each configured to support a licensed spectrum, such as an LTE or 5G-NR air-interface technology. In the illustrated example, the base station node 104 may include a first cell 202 that is configured to support client devices operating on a first spectrum, such as an LTE air-interface technology, and a second cell 204 that is configured to support client devices operating on a second spectrum, such as 5G-NR air-interface technology. Alternatively, the first cell 202 may support 5G-NR and the second cell 204 may support LTE.

The first cell 202 may include one or more first subframes 206(1)-206(M), and the second cell 204 may include one or more second subframe(s) 208(1)-208(P). Each subframe may have a predetermined length. The predetermined length may be one millisecond (ms), however, any predetermined length is possible.

The SSO system 102 may be configured to transmit optimization data 110 to the base station node 104. The optimization data 110 may include computer-executable instructions that perform one or more optimization actions on the first cell 202 or the second cell 204. In one example, an optimization action may include dynamically designating a select number of subframes within one of the first cell 202 or the second cell 204 as MBSFN subframes. In FIG. 2A, the optimization data 110 may be configured to designate subframes 208(P-1) and 208(P) of the second cell 204, as MBSFN subframes. The optimization data 110 may further configure the MBSFN subframes to support the first spectrum associated with the first cell 202, which in this example corresponds to the LTE air-interface technology.

Referring to FIG. 2B, the SSO system 102 may generate optimization data 110 that includes computer-executable instructions that dynamically generates a BWP within the subframe(s) 208(1)-208(P) of the second cell 204. It is noteworthy that since BWP technology is a feature of 5G-NR air-interface technology, the frequency division of subframe(s) 208(1)-208(P) does not impact the ability of LTE devices to use the full frequency spectrum of the subframes designated for LTE, namely subframes 208(P-1) and subframe 208(P) (i.e. refer to MBSFN subframes of FIG. 2A). For example, LTE devices that are configured to use subframes 208(P-1) and subframe 208(P) of the second cell 204 may use the full frequency spectrum irrespective of the frequency division imposed by the BWP on the second cell 204.

By way of example, consider subframe 208(P-2) of the second cell 204, which is also a representative example of subframe 208(1) and subframe 208(2). In FIG. 2B, subframe 208(P-2) is configured to support the 5G-NR air-interface technology, and by extension communication transmissions via 5G-NR enabled client devices. However, it is noteworthy that some LTE client devices may also operate within subframe 208(P-2), even though subframe 208(P-2) has been configured for the 5G-NR spectrum. For example, Transmission Mode 9 (TM9)-enabled client devices may operate within the 5G-NR spectrum. TM9-enabled client devices are configured with a transmission mode defined under LTE that can relay communication transmissions via a 5G-NR air-interface technology.

Again, referring to FIG. 2B, the BWP within subframe 208(P-2) may define the operating bandwidth for 5G-NR communication transmissions. In other words, 5G-NR communication transmissions may be operable only within the frequency range of the BWP, leaving the remaining bandwidth of subframe 208(P-2) unused, notwithstanding usage by TM9-enabled client devices. In an alternative embodiment that is not shown in FIG. 2B for purposes of clarity, the BWP of the second cell 204 may be defined for a subset of 5G-NR communication transmissions, such as those related to IoT devices. In this way, the remaining bandwidth of subframe 208(P-2), other than the bandwidth allotted to the BWP is usable for other 5G-NR enabled client devices. Again, in this alternate embodiment, TM9-enabled client devices may use the full frequency bandwidth of subframe 208(P-2) since these devices are defined under LTE, and BWP technology does not impose a frequency division within the LTE spectrum.

Moreover, consider subframe 208(P) of the second cell 204, which is also a representative example of subframe 208(P-1). In FIG. 2B, subframe 208(P) includes the BWP imposed on subframes 208(1)-208(P), for 5G-NR communication transmissions. Subframe 208(P) is further configured to support the LTE air-interface technology, based on configured MBSFN subframes, as described earlier with reference to FIG. 2A. Therefore, the BWP of subframe 208(P) may support 5G-NR communication transmissions, however since BWP technology is a feature of the 5G-NR air-interface technology, the frequency division does not impact the ability of LTE devices to use the full frequency spectrum of subframe 208(P). Therefore, LTE devices that are configured to use subframe 208(P) may use the full frequency spectrum irrespective of the frequency division imposed by the BWP on the second cell 204.

Referring to FIG. 2C, the SSO system 102 may generate optimization data 110 that includes computer-executable instructions that dynamically generate a plurality of BWPs within the subframe(s) 208(1)-208(P). For the sake of brevity and ease of description, various details relating to FIG. 2C are omitted herein to the extent that the same or similar details have been provided above in relation to FIG. 2B.

Figure 3:
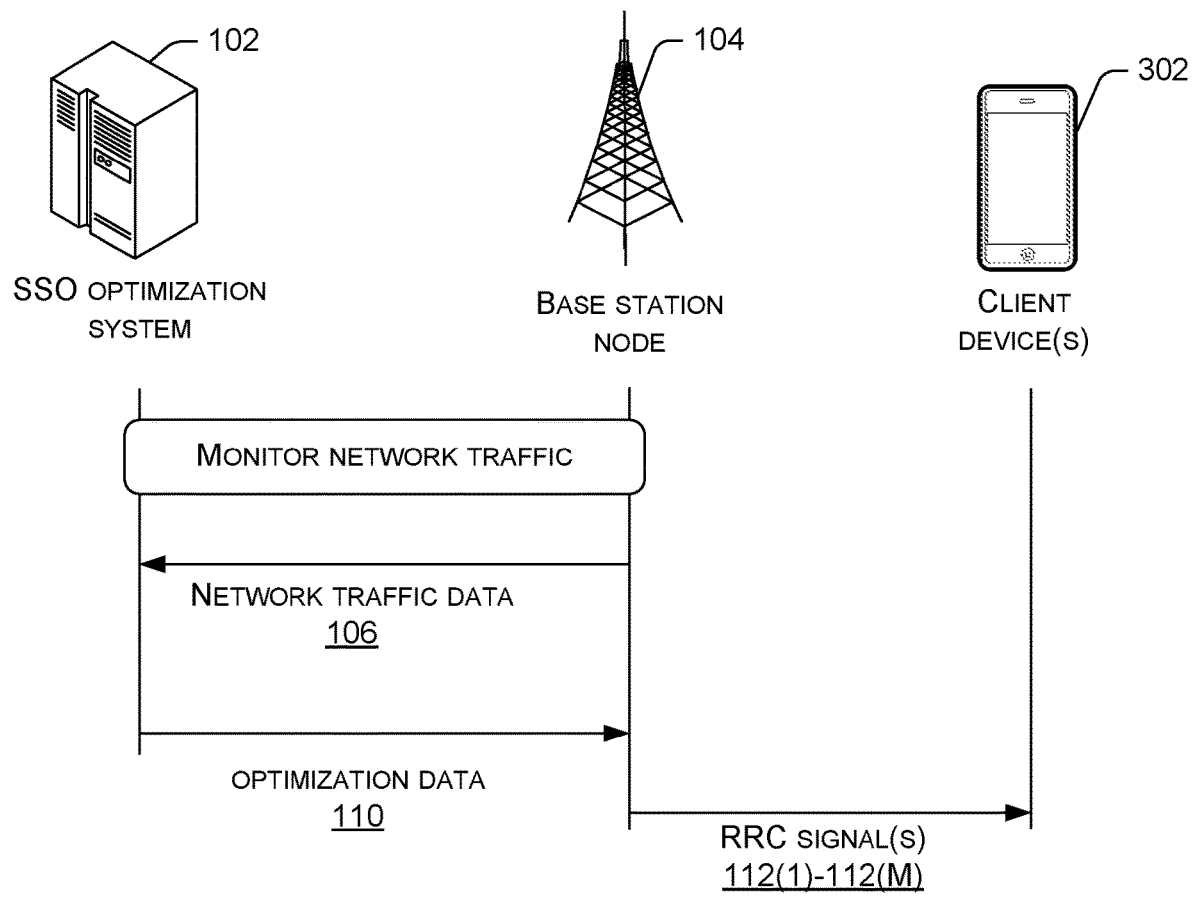
FIG. 3 illustrates a block diagram of an SSO system process for configuring an interaction between a client device and a cell of a base station node.

In FIG. 2C, the optimization data 110 is configured to impose two BWPs, namely BWP 1 and BWP 2, on subframe(s) 208(1)-208(P), for 5G-NR communication transmissions. BWP 1 and BWP 2 overlap one another such that BWP 2 is within the bandwidth domain of BWP 1. In some examples, BWP 1 may be a bandwidth allocation for a first set of 5G-NR communication transmissions, and BWP 2 may be a bandwidth allocation for a second set of 5G-NR enabled communications transmissions. The first set and the second set may be distinguished by the 5G-NR client devices, the service type associated with the communication transmission (i.e. stream multimedia content, download multimedia content, Voice over Internet Protocol (VoIP), Video over Internet Protocol (VioIP), and/or so forth), or combination of both. In an alternate embodiment, BWP 1 may be contiguous to BWP 2, such that the bandwidth domain of BWP 1 and BWP 2 do not overlap, meaning that the first set and second set of 5G-NR communication transmissions do not share a bandwidth allocation FIG. 3 illustrates a block diagram of an SSO system 102 process for configuring an interaction between a client device 302 and a cell of a base station node 104. The client device 302 may correspond to one of client device(s) 114(1)-114(P). Further, for 5G-NR-enabled client devices, the client device 302 may be configured to interact with a BWP of the cell. Alternatively, or additionally, the client device 302 may be configured to interact with one or more MBSFN subframe(s) of the cell that is configured for an air-interface technology associated with the client device 302 (i.e. LTE or 5G-NR).

The SSO system 102 may monitor network traffic at a base station node 104. The SSO system 102 may monitor network traffic on a continuous basis, per a predetermined schedule, or in response to a triggering event. The predetermined schedule may be based on a time interval of 15 minutes, 30 minutes, one hour, 12 hours, or 24 hours; however, any time interval is possible. Further, the triggering event may correspond to receipt of an indication that real-time network traffic at a base station node 104, has exceeded a predetermined threshold.

In response to the monitoring event, the SSO system 102 may receive network traffic data 106 from the base station node 104. The network traffic data 106 may include telemetry data of bandwidth utilization (i.e. LTE and 5G-NR) for each cell of the base station node. The network traffic data 106 may include network usage characteristics such as client device identifiers, device type identifiers, indications of bandwidth used to stream multimedia content, download multimedia content, Voice over Internet Protocol (VoIP), Video over Internet Protocol (VioIP), and/or so forth. In some examples, the network usage characteristics may be used by the SSO system 102 in determining whether to allocate available bandwidth between different air-interface technologies (i.e. LTE and 5G-NR) based on scheduling criteria.

The SSO system 102 may analyze the network traffic data 106 and in doing so, generate optimization data 110 to share available bandwidth within a cell of the base station node 104 between different air-interface technologies (i.e. LTE and 5G-NR). The SSO system 102 may analyze the network traffic data 106 by correlating the network traffic data 106 with data-points of a network congestion model. In this way, the SSO system 102 may infer a distribution of available bandwidth between different air-interface technologies, based on a record of historical network traffic data.

The optimization data 110 may include computer-executable instructions that cause the base station node 104 to use a frequency division technique, a time division technique, or a combination of both, share the available bandwidth. In some examples, the optimization data 110 may further include RRC signals that are intended for client device(s) 114(1)-114(P) interacting with base station node via a supported air-interface technology. The SSO system 102 may generate the RRC signal based at least in part on scheduling criteria that prioritize the use of a portion of bandwidth for a portion of communication transmissions. Scheduling criteria may be based on user-priority, device-priority, service-priority, or any combination thereof. Scheduling criteria may also be based on an origin and/or destination of the communication transmission itself, such as a public or private event. In response to receiving the optimization data 110, the base station node 104 may transmit the RRC signal(s) 112(1)-112(M) to the client device(s) 114(1)-114(P).

Figure 4:
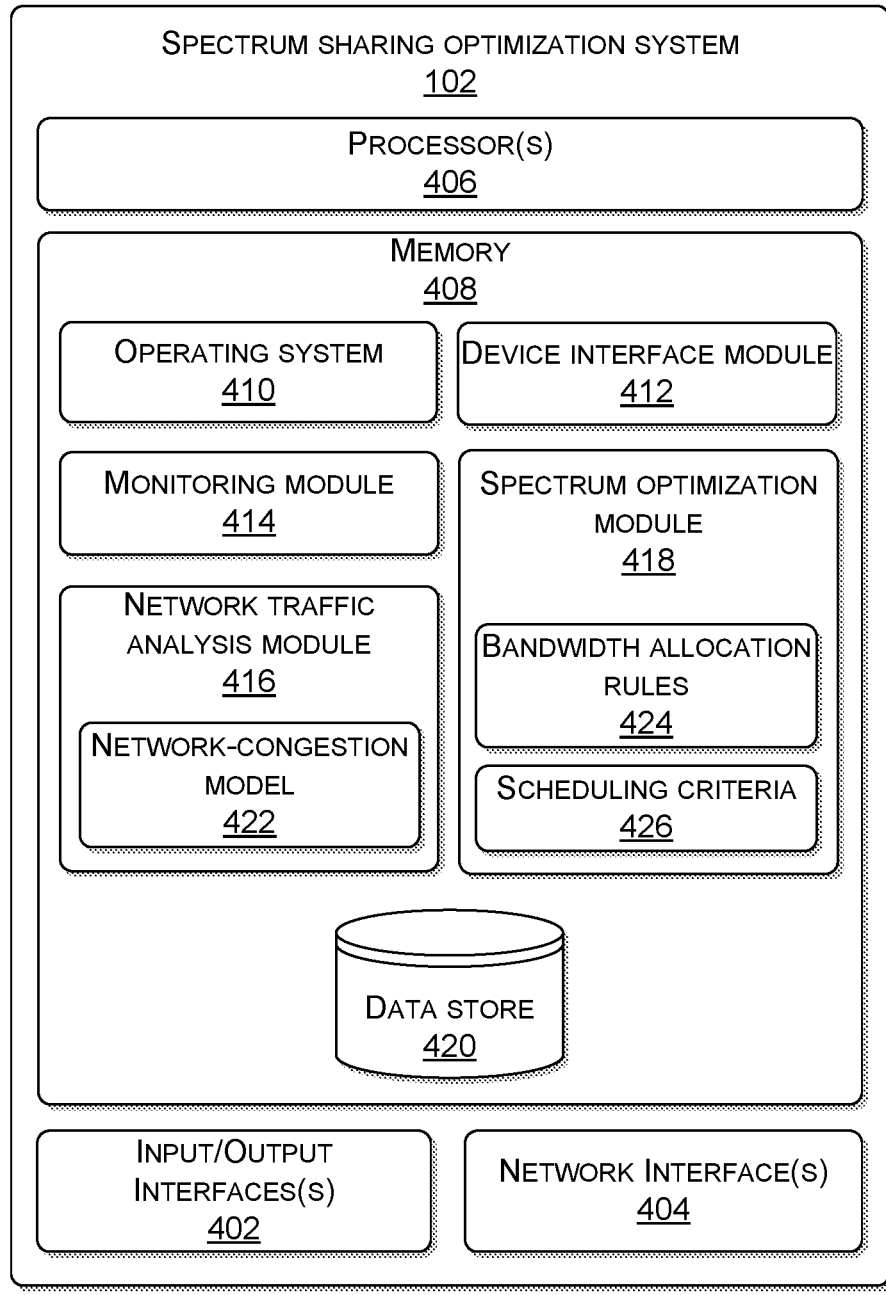
FIG. 4 illustrates a block diagram of various components of the Spectrum sharing optimization (SSO) system.

FIG. 4 illustrates a block diagram of various components of the Spectrum sharing optimization (SSO) system. The SSO system 102 may include routines, program instructions, objects, and/or data structures that perform particular tasks or implement abstract data types. Further, the SSO system 102 may include input/output interface(s) 402. The input/output interface(s) 402 may include any type of output interface known in the art, such as a display (e.g. a liquid crystal display), speakers, a vibrating mechanism, or a tactile feedback mechanism. Input/output interface(s) 402 also include ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SSO system 102 may include network interface(s) 404. The network interface(s) 404 may include any sort of transceiver known in the art. For example, the network interface(s) 404 may include a radio transceiver that performs the function of transmitting and receiving radio frequency communications via an antenna. In addition, the network interface(s) 404 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 404 may include wired communication components, such as an Ethernet port or a Universal Serial Bus (USB).

Further, the SSO system 102 may include one or more processor(s) 406 that are operably connected to memory 408. In at least one example, the one or more processor(s) 406 may be a central processing unit(s) (CPU), graphics processing unit(s) (GPU), both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 406 may also be responsible for executing all computer applications stored in the memory, which can be associated with common types of volatile (RAM) and/or non-volatile (ROM) memory.

In some examples, memory 408 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 408 may include an operating system 410, a device interface module 412, a monitoring module 414, a network traffic analysis module 416, a spectrum optimization module 418, and a data-store 420. The operating system 410 may be any operating system capable of managing computer hardware and software resources.

The device interface module 412 may enable a client device to provide input to the SSO system 102 and receive output from the SSO system 102. Example data input may include an input or adjustment of bandwidth allocation criteria, scheduling criteria, time intervals for monitoring events of real-time network traffic, or triggering events that initiate a monitoring event of network traffic.

The monitoring module 414 may be configured to monitor real-time network traffic at a base station node. The monitoring module 414 may monitor network traffic on a continuous basis, per a predetermined schedule, or in response to a triggering event. The predetermined schedule may be based on a time interval of 15 minutes, 30 minutes, one hour, 12 hours, or 24 hours; however, any time interval is possible. Further, the triggering event may correspond to receipt of an indication that real-time network traffic at the base station node has exceeded a predetermined threshold. The predetermined threshold may be associated with a threshold Quality of Service (QoS) for corresponding communication transmissions. The QoS may relate to packet loss, latency, jitter, echo, downlink throughput, uplink throughout, or any combination thereof. Alternatively, or additionally, the triggering event may correspond to receipt of an indication that real-time network traffic has exceeded a predetermined bandwidth capacity of a cell of the base station node.

In response to a monitoring event, the monitoring module 414 may retrieve network traffic data from a base station node. The network traffic data may include telemetry data of bandwidth utilization for each cell of the base station node. Network traffic data may also include network usage characteristics such as client device identifiers, device type identifiers, indications of bandwidth used to stream multimedia content, download multimedia content, Voice over Internet Protocol (VoIP), Video over Internet Protocol (VioIP), and/or so forth. In some examples, network usage characteristics may also include geographic location data of client devices that initiate or receive communication transmissions via the base station node.

The network traffic analysis module 416 may analyze the network traffic data received from the base station node to determine whether to share available bandwidth within a cell of the base station node, between different air-interface technologies, namely LTE and 5G-NR. The network traffic analysis module 416 may determine whether bandwidth utilization for a first air-interface technology (i.e. LTE or 5G-NR) is greater than or equal to a predetermined bandwidth capacity for the first air-interface technology with the cell of the base station node. The predetermined bandwidth capacity may correspond to a portion, but not all, of the bandwidth capacity of the cell. In this example, the cell may be configured to support 5G-NR and LTE simultaneously via at least one of a time-division (i.e. MBSFN subframes) or frequency-division (i.e. BWP) technique. Thus, the predetermined bandwidth capacity for an air-interface technology may correspond to the bandwidth made available on the cell for the air-interface technology via the time-division and/or frequency division techniques. Additionally, or alternatively, the predetermined bandwidth capacity may correspond to a bandwidth this is required to maintain a threshold QoS for communication transmissions via the air-interface technology.

In response to determining that bandwidth utilization is greater than or equal to a predetermined bandwidth capacity, the network traffic analysis module 416 may transmit a signal to the spectrum optimization module 418 to adjust bandwidth allocation between the air-interface technologies within the cell of the base station node.

In some examples, the network traffic analysis module 416 may analyze real-time network traffic statically, semi-statically, or dynamically. Static analysis may correspond to an analysis of relative market penetration for client devices that operate via an air-interface technology (i.e. LTE or 5G-NR). A semi-static analysis may combine market penetration analysis with an analysis of real-time network traffic transmitted via the base station node. A dynamic analysis may correspond to an analysis of real-time network traffic transmitted via the base station node.

Moreover, the network traffic analysis module 416 may employ one or more trained machine learning algorithms to correlate network traffic data with historical network traffic data, and in doing so, infer whether a bandwidth utilization for an air-interface technology is likely to be greater than or equal to a predetermined bandwidth capacity for the air-interface technology in a cell of a base station node. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

The network traffic analysis module 416 may generate a network-congestion model 422 based on historical network traffic data over a predetermined time interval. The historical network traffic data may include data components similar to those of the network traffic data, such as telemetry data of bandwidth utilization for each cell of the base station node, network usage characteristics including geographic location data of client devices that initiate or receive communication transmissions via the base station node. The network traffic analysis module 416 may continuously evaluate historical network traffic data to progressively refine the network-congestion model 422. As more historical network traffic data becomes available, a continuously more accurate network-congestion model 422 can be developed.

In various examples, the network traffic analysis module 416 may correlate network traffic data with data points of the network-congestion model 422, and in doing so, infer whether a bandwidth utilization for an air-interface technology is likely to be greater than or equal to a predetermined bandwidth capacity for the air-interface technology in a cell of the base station node. The similarity between the real-time network traffic and data-points of the network-congestion model 422 may be determined by measuring the Euclid distance between the real-time network traffic and the data-points of the network-congestion model 422.

It is noteworthy that the network traffic analysis module 416 may perform the same analysis of network traffic data for different air-interface technologies (i.e. LTE and 5G-NR) that share a common resource with a cell of a base station node. In this way, the network traffic analysis module 416 may provide the spectrum optimization module 418 with the data that indicates a first air-interface technology is approaching or has exceeded an allotted bandwidth capacity, while the second air-interface technology has at least one available bandwidth capacity.

In some examples, the network traffic analysis module 416 may analyze the energy requirements of a subset of client devices configured to operate within the 5G-NR spectrum. The energy requirements may be useful to the spectrum optimization module 418 when determining the frequency bandwidth of the BWP for the subset of client devices, based on their respective energy requirements.

The spectrum optimization module 418 may be configured to generate optimization data that shares available bandwidth within a cell of a base station node between different air-interface technologies. The spectrum optimization module 418 may receive an analysis of network traffic data from the network traffic analysis module 416, and in doing so, employ one or more trained machine-learning algorithms to determine whether to employ time-division (i.e. configuring MBSFN subframes) or frequency-division (i.e. BWPs) techniques to share available bandwidth between different air-interface technologies (i.e. LTE or 5G-NR) within a cell of a base station node.

Moreover, the spectrum optimization module 418 may use bandwidth allocation rules 424 to allocate available bandwidth between different air-interface technologies. Bandwidth allocation rules 424 may include regulatory requirements that stipulate a threshold bandwidth is to be made available for each air-interface technology. Alternatively, or additionally, bandwidth allocation rules 424 may include threshold bandwidths imposed by a telecommunication service provider that is intended to ensure a network efficiency for communication transmissions.

The bandwidth allocation rules may also correlate energy consumption rates of 5G-NR client devices, particularly IoT devices, with frequency bandwidths. For example, narrow bandwidths for IoT devices may create power saving efficiencies by lowering the sample rate and reducing the baseband processing of their RF-baseband interfaces, relative to wider bandwidths. Thus, the bandwidth allocation rules may define a narrow frequency bandwidth for a BWP that is to be used for a subset of 5G-NR client devices (i.e. IoT devices).

Additionally, or alternatively, the spectrum optimization module 418 may use network usage characteristics to allocate available bandwidth between different air-interface technologies. Further, network usage characteristics may also be used to distinguish between the use of time-division and frequency-division techniques in allocating available bandwidth within a cell of a base station node. Particularly, the spectrum optimization module 418 may preferentially select a time-division technique (i.e. configuring a cell with MBSFN subframes), for instances of real-time network traffic that exhibits high-bandwidth usage. In a non-limiting example, these instances may include streaming or downloading high-resolution multimedia content.

In contrast, the spectrum optimization module 418 may preferentially select a frequency-division technique (i.e. BWP technology) to facilitate isolating a set of 5G-NR devices to a narrow bandwidth for the benefit of the 5G-NR devices (i.e. power efficiencies), or for the benefit of other devices operating within the spectrum. Referring to the latter, by assigning the set of 5G-NR devices to a narrow bandwidth, other remaining client devices may share the remaining spectrum unimpeded and without interference.

The spectrum optimization module 418 may further generate RRC signals that are intended for client devices that interact with the air-interface technologies via the base station node. The RRC signals may be configured to enable a client device to perform some behavior, such as add, activate, or select a cell or an MBSFN subframe of a cell of the base station. The RRC signals may be further configured to select a BWP for communication transmissions via a 5G-NR air-interface technology.

In some example, the spectrum optimization module 418 may be configured to prioritize a subset of client devices over others, based at least in part on scheduling criteria 426. Scheduling criteria may be based on the air-interface technology (i.e. 5G-NR or LTE), user-priority, device-priority, service-priority, or any combination thereof. Scheduling criteria may also be based on an origin and/or destination of the communication transmission itself, such as a public or private event. In some examples, the scheduling criteria 426 may be configured to maintain a threshold QoS based on user-priority, device-priority, service-priority, or any combination thereof. The QoS may relate to packet loss, latency, jitter, echo, downlink throughput, uplink throughout, or any combination thereof.

The data-store 420 may include historical network traffic data that is captured by the base station node over a predetermined time interval. Further, the data-store 420 may include data records that relate to market penetration of client devices that operate via one or more air-interface technology (i.e. LTE or 5G-NR). The data-store 420 may further include the bandwidth allocation rules 424, scheduling criteria 426, and network-congestion model 422.

Figure 5:
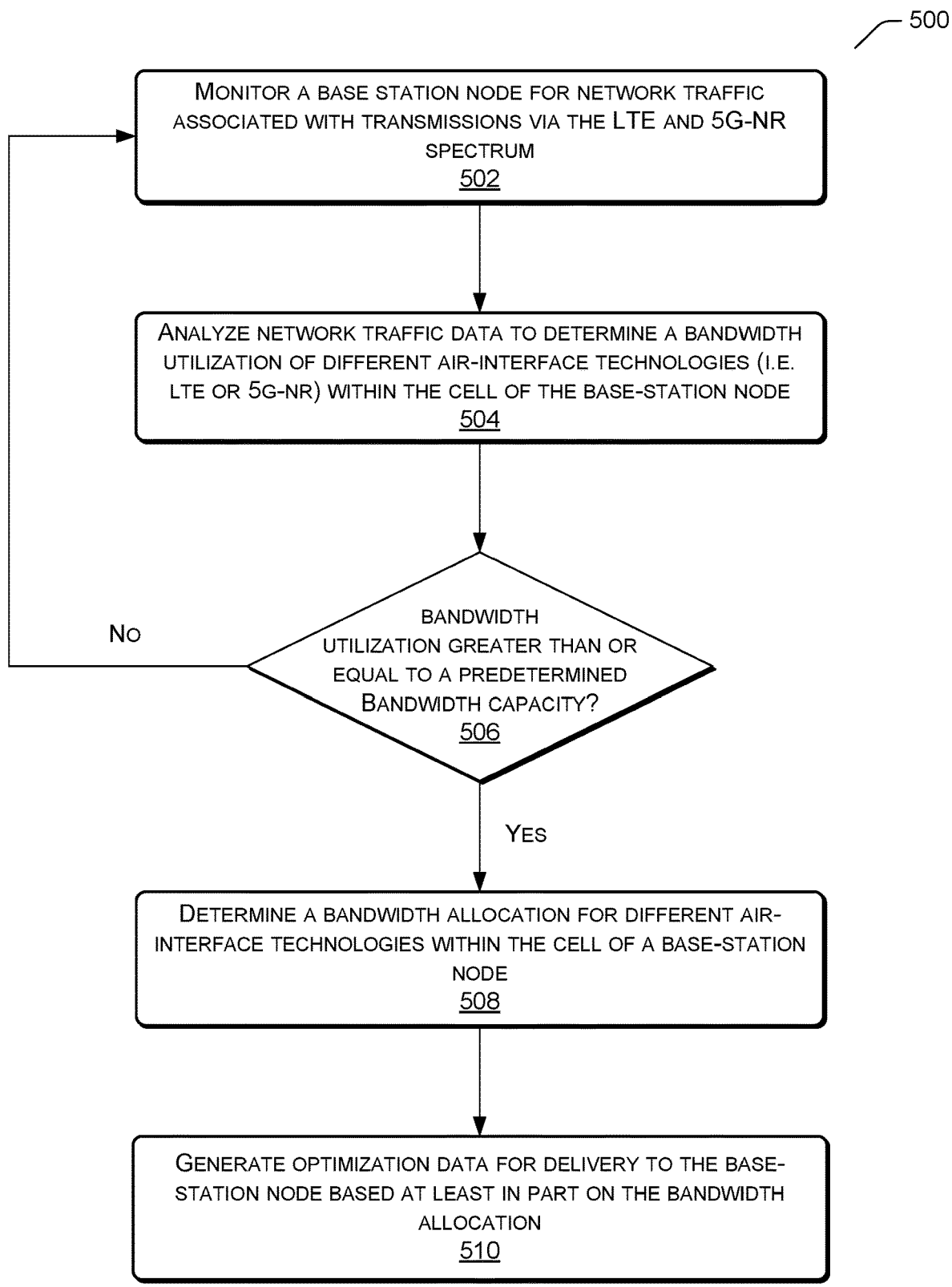
FIG. 5 illustrates an SSO system process for generating and transmitting optimization data to a base station node for sharing available bandwidth within a cell of the base station node between different air-interface technologies.

FIG. 5 presents process 500 that relates to operations of the SSO system 102. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the exemplary architecture 100 of FIG. 1.

FIG. 5 illustrates an SSO system process for generating and transmitting optimization data to a base station node for sharing available bandwidth within a cell of the base station node between different air-interface technologies.

At 502, the SSO system may monitor a base station node for network traffic, in real-time or near real-time. For each monitoring event, the SSO system may retrieve network traffic data that includes telemetry data of bandwidth utilization (i.e. LTE and 5G-NR) for each cell of the base station node and network usage characteristics. Network usage characteristics may include, but are not limited to, client device identifiers, device type identifiers, indications of bandwidth used to stream multimedia content, download multimedia content, Voice over Internet Protocol (VoIP), Video over Internet Protocol (VioIP), and geographic location data of client devices that communicate via the base station node.

At 504, the SSO system may analyze the network traffic data to determine bandwidth utilization of different air-interface technologies (i.e. LTE and 5G-NR) within the cell of a base station node. In this example, the cell may be configured to support 5G-NR and LTE simultaneously via at least one of a time-division (i.e. MBSFN subframes) or frequency-division (i.e. BWP) technique.

At 506, the SSO system may determine whether the bandwidth utilization of air-interface technologies (.e. LTE and 5G) within the cell of the base station node is greater than or equal to a predetermined bandwidth capacity for each air-interface technology within the cell. The predetermined bandwidth capacity for an air-interface technology may correspond to the bandwidth made available on the cell for the air-interface technology via the time-division and/or frequency division techniques. Additionally, or alternatively, the predetermined bandwidth capacity may correspond to a bandwidth made available to maintain a threshold QoS for communication transmissions via a corresponding air-interface technology.

In response to determining that the bandwidth utilization of air-interface technologies within the cell of the base station node is less than a predetermined bandwidth capacity for each air-interface technology within the cell, process 500 may return to step 502 and continue to monitor the base station node for network traffic, in real-time or near real-time.

Alternatively, in response to determining that the bandwidth utilization of air-interface technologies within the cell of the base station node is less than a predetermined bandwidth capacity for each air-interface technology within the cell, process 500 may continue to step 508.

At 508, the SSO system may determine a bandwidth allocation for different air-interface technologies within the cell of the base station node. The bandwidth allocation may be implemented via time-division (i.e. configuring a cell with MBSFN subframes), frequency-division techniques (i.e. BWP technology), or a combination of both. Further, the bandwidth allocation may be based at least in part on the bandwidth utilization of air-interface technologies, bandwidth allocation rules, and network usage characteristics.

At 510, the SSO system may generate optimization data for delivery to the base station node. The optimization data may include computer-executable instructions that dynamically perform the bandwidth allocation different air-interface technologies, based at least in part on the bandwidth allocation.

The optimization data may further include RRC signals that are intended for client devices interacting with the base-state node via a support air-interface technology. The RRC signals may be configured to enable a client device to perform some behavior, such as add, activate, or select a cell or an MBSFN subframe of a cell of the base station node. The SSO system may generate the RRC signals based on scheduling criteria. Scheduling criteria may be based on user-priority, device-priority, service-priority, or any combination thereof. Scheduling criteria may also be based on an origin and/or destination of the communication transmission itself, such as a public or private event.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
retrieving, from a data store, historical network traffic data associated with a base station node;
generating a network-congestion model for the base station node, based at least in part on the historical network traffic data;
monitoring network traffic data at the base station node, the base station node including at least one cell that is configured for 5G-NR communication transmissions via a 5G-New Radio (5G-NR) spectrum;
analyzing the network traffic data with data-points of the network-congestion model to determine an LTE bandwidth requirement and a bandwidth part (BWP) for 5G-NR communication transmissions within one cell of the base station node;
identifying a select number of subframes of a plurality of subframes associated with the one cell for configuration as Multicast Broadcast Single Frequency Network (MBSFN) subframes for LTE communication transmissions, based at least in part on the LTE bandwidth requirement;
and
generating optimization data for transmission to the base station node, the optimization data including computer-executable instructions that configure the select number of subframes as the MBSFN subframes and further configure the BWP within the one cell of the base station node.

2. The computer-implemented method of claim 1, further comprising:
retrieving, from the data store, bandwidth allocation rules that define a threshold bandwidth allocation for the LTE communication transmissions, and
wherein, the identifying the select number of subframes for the LTE communication transmissions is based at least in part on the bandwidth allocation rules.

3. The computer-implemented method of claim 1, further comprising:
identifying one or more client devices configured to operate within the 5G-NR spectrum, based at least in part on analysis of the network traffic data; and
analyzing energy requirements of the one or more client devices, the energy requirements being associated with a sample rate or baseband processing of the 5G-NR communication transmissions, and
wherein, determining the BWP is further based at least in part on the energy requirements.

4. The computer-implemented method of claim 1, further comprising:
identifying one or more client devices configured to operate within the 5G-NR spectrum, based at least in part on analysis of the network traffic data; and retrieving, from the data store, bandwidth allocation rules associated with energy consumption of the one or more client devices configured to operate within the 5G-NR spectrum, and determining a frequency bandwidth of the BWP is further based at least in part on the bandwidth allocation rules.

5. The computer-implemented method of claim 1, wherein the BWP is a first BWP, further comprising:

identifying one or more client devices configured to operate within the 5G-NR spectrum, based at least in part on analysis of the network traffic data;

identifying a subset of the one or more client devices as low-energy Internet-of-Things (IoT) devices; and determining a second BWP for the 5G-NR communication transmissions associated with the low-energy IoT devices, the second BWP having a narrower bandwidth relative to the first BWP, and wherein, generating the optimization data for transmission to the base station node further includes computer-executable instructions that configure the second BWP within the one cell of the base station node.

6. The computer-implemented method of claim 1, further comprising:

identifying one or more client devices configured to operate within the 5G-NR spectrum, based at least in part on analysis of the network traffic data;

generating Radio Resource Control (RRC) signal data for transmission to the one or more client devices to operate within a frequency bandwidth of the BWP; and transmitting the RRC signal data to the base station node.

7. The computer-implemented method of claim 1, further comprising:

retrieving, from a data-store, scheduling criteria that prioritize the LTE communication transmissions within the BWP of the MBSFN subframes ahead of the 5G-NR communication transmissions, based at least in part on the scheduling criteria and the LTE bandwidth requirement;

generating RRC signal data to prioritize the LTE communication transmissions; and transmitting RRC signal data to the base station node.

8. The computer-implemented method of claim 1, wherein the one cell includes a first Time Division (TD) and a second (TD), the first (TD) corresponding to the MBSFN subframes, and the second (TD) corresponding to remaining subframes of the plurality of subframes, and further comprising:

identifying a subset of the LTE communication transmissions associated with Transmission Mode 9 (TM9)-enabled client devices, based at least in part on analysis of the network traffic data;

generating RRC signal data that prioritizes the subset of the LTE communication transmissions to occur within the first (TD); and transmitting the RRC signal data to the base station node.

9. One or more non-transitory computer-readable media storing computer-executable instructions that, when executed on one or more processors, cause the one or more processors to perform acts comprising:

retrieving, from a data store, historical network traffic data associated with a base station node;

generating a network-congestion model for the base station node, based at least in part on the historical network traffic data;

analyzing network traffic data at the base station node operating within a telecommunication network relative to data-points of the network-congestion model to determine an LTE bandwidth requirement and a bandwidth part (BWP) for 5G-NR communication transmissions, the base station node including at least one cell that is configured for communications via a first spectrum;

identifying a select number of subframes of a plurality of subframes associated with the one cell for configuration as Multicast Broadcast Single Frequency Network (MBSFN) subframes for communication transmissions via a second spectrum, based at least in part on analysis of the network traffic data;

identifying a plurality of client devices configured to operate within a 5G-NR spectrum, the 5G-NR spectrum corresponding to one of the first spectrum or the second spectrum; and generating optimization data for transmission to the base station node, the optimization data including computer-executable instructions that configure the select number of subframes as the MBSFN subframes and further configure the BWP within the one cell of the base station node.

10. The one or more non-transitory computer-readable media of claim 9, wherein the first spectrum and the second spectrum corresponds to one of the 5G-NR spectrum or an LTE spectrum, and wherein the second spectrum is different from the first spectrum.

11. The one or more non-transitory computer-readable media of claim 9, further storing instructions that, when executed on one or more processors, cause the one or more processors to perform acts comprising:

retrieving, from the data store, bandwidth allocation rules that is configured to prioritize communication transmissions via the first spectrum relative to the second spectrum, and wherein, determining the BWP for the 5G-NR communication transmissions is based at least in part on the bandwidth allocation rules.

12. The one or more non-transitory computer-readable media of claim 9, wherein the BWP is a first BWP, and further storing instructions that, when executed on one or more processors, cause the one or more processors to perform acts comprising:

determining a first subset of client devices of the plurality of client devices and a second subset of client devices of the plurality of client devices, based at least in part on one of energy consumption requirements or bandwidth usage requirements; and determining a second BWP for communication transmissions associated with the second subset of client devices, and wherein, generating the optimization data for transmission to the base station node further includes computer-executable instructions that dynamically configure the second BWP.

13. The one or more non-transitory computer-readable media of claim 12, further storing instructions that, when executed on one or more processors, cause the one or more processors to perform acts comprising:

generating RRC signal data that prioritizes a first set of communication transmissions associated with the first subset of client devices to occur via the first BWP and a second set of communication transmissions associated with the second subset of client devices to occur via the second BWP, based at least in part on scheduling criteria; and transmitting the RRC signal data to the base station node.

14. The one or more non-transitory computer-readable media of claim 9, further storing instructions that, when executed on one or more processors, cause the one or more processors to perform acts comprising:
  identifying a first subset of client devices configured to operate within the first spectrum and a second subset of client devices configured to operate within the second spectrum, based at least in part on analysis of the network traffic data;
  generating RRC signal data that prioritizes communication transmissions associated with the second subset of client devices to occur within the MBSFN subframes, and prioritizes communication transmissions associated with the first subset of client devices to occur within remaining subframes of the plurality of subframes associated with the one cell; and
  transmitting the RRC signal data to the base station node.

15. A system comprising:
  one or more processors;
  memory coupled to the one or more processors, the memory including one or more modules that are executable by the one or more processors to:
  retrieve, from a data store, historical network traffic data associated with a base station node;
  generate a network-congestion model for the base station node, based at least in part on the historical network traffic data;
  monitor network traffic data at the base station node operating within a telecommunication network, the base station node including at least one cell that is configured for communications via a first spectrum;
  correlate the network traffic data with data-points of the network-congestion model to determine an LTE bandwidth requirement and a bandwidth part (BWP) for 5G-NR communication transmissions within the at least one cell of the base station node;
  identify a select number of subframes of a plurality of subframes associated with the one cell for configuration as Multicast Broadcast Single Frequency Network (MBSFN) subframes for communication transmissions via a second spectrum, based at least in part on a correlation of the network traffic data with data points of the network-congestion model; and
  generate optimization data for transmission to the base station node that includes computer-executable instructions to configure the select number of subframes as the MBSFN subframes and further configure the BWP within the one cell of the base station node.

16. The system of claim 15, wherein the one or more modules are further executable by the one or more processors to:
  retrieve, from the data store, bandwidth allocation rules that is configured to prioritize communication transmissions via the first spectrum relative to the second spectrum, and
  wherein, determining the BWP for the 5G-NR communication transmissions is based at least in part on the bandwidth allocation rules.

17. The system of claim 15, wherein the second spectrum corresponds to a 5G-NR spectrum, and wherein the one or more modules are further executable by the one or more processors to:
  retrieve, from a data-store, scheduling criteria that prioritize communication transmissions associated with a first subset of 5G-NR client devices relative to a second subset of 5G-NR client devices, the scheduling criteria being at least in part on user-priority, device-priority, or service-priority;
  generate RRC signal data that prioritizes communication transmissions associated with the first subset of 5G-NR client devices within the BWP; and
  transmit the RRC signal data to the base station node.

18. The one or more non-transitory computer-readable media of claim 9, wherein determining the BWP for the 5G-NR communication transmissions is further based at least in part on a correlation of the network traffic data and the data-points of the network-congestion model.

19. The system of claim 15, wherein the one or more modules are further executable by the one or more processors to:
  identify one or more client devices configured to operate within a 5G-NR spectrum, based at least in part on analysis of the network traffic data; and
  determine energy requirements of the one or more client devices, the energy requirements being associated with a sample rate or baseband processing of the 5G-NR communication transmissions, and
  wherein to determine the BWP is further based at least in part on the energy requirements.

20. The system of claim 15, wherein the first spectrum and the second spectrum corresponds to one of the 5G-NR spectrum or an LTE spectrum, and
  wherein the second spectrum is different from the first spectrum.

* * * * *